United States Patent
Fam et al.

(10) Patent No.: US 12,229,810 B2
(45) Date of Patent: Feb. 18, 2025

(54) MACHINE INTELLIGENCE PLATFORM

(71) Applicant: Markaaz, Inc., Austin, TX (US)

(72) Inventors: Hany A. Fam, Poole (GB); Fabienne Hubschmid, Zufikon (CH)

(73) Assignee: Markaaz, Inc., Austin, TX (US)

(*) Notice: Subject to any disclaimer, the term of this patent is extended or adjusted under 35 U.S.C. 154(b) by 305 days.

(21) Appl. No.: 17/544,775

(22) Filed: Dec. 7, 2021

(65) Prior Publication Data

US 2022/0180409 A1 Jun. 9, 2022

Related U.S. Application Data

(60) Provisional application No. 63/122,170, filed on Dec. 7, 2020.

(51) Int. Cl.
*G06Q 30/0282* (2023.01)
*G06F 16/9032* (2019.01)
*G06N 3/02* (2006.01)

(52) U.S. Cl.
CPC ... *G06Q 30/0282* (2013.01); *G06F 16/90332* (2019.01); *G06N 3/02* (2013.01)

(58) Field of Classification Search
None
See application file for complete search history.

(56) References Cited

U.S. PATENT DOCUMENTS

| | | | | |
|---|---|---|---|---|
| 9,690,776 | B2* | 6/2017 | Sarikaya | G06F 40/30 |
| 2013/0111348 | A1* | 5/2013 | Gruber | G10L 21/06 |
| | | | | 715/727 |
| 2015/0213361 | A1* | 7/2015 | Gamon | G06N 20/00 |
| | | | | 706/12 |
| 2018/0068031 | A1* | 3/2018 | Hewavitharana | G06F 9/30156 |

OTHER PUBLICATIONS

Rajput, Ajit. "Semantic Search using NLP," [online] Medium.com, published on Aug. 31, 2020, available at: < https://medium.com/analytics-vidhya/semantic-search-engine-using-nlp-cec19e8cfa7e > (Year: 2020).*
Serrano, "Neural Networks in Big Data and Web Search" published Dec. 2018 available at: < https://www.mdpi.com/2306-5729/4/1/7 >, (Year: 2018).*

* cited by examiner

*Primary Examiner* — Richard W. Crandall
(74) *Attorney, Agent, or Firm* — Ice Miller LLP

(57) ABSTRACT

Machine intelligence platform system and methods include a server, coupled to a processor, and configured to execute instructions that: receive an input from a user; translate the input to a perceived intent; apply one or more algorithms to the perceived intent; and output a response to the user. The server includes a user interface (UI) layer configured to receive the input from a user and to transmit an output to the user, an intent layer configured to translate input received from the UI layer into a perceived intent, an intelligence layer configured to apply one or more algorithms to the perceived intent based on one or more classes of data, the classes of data selected from: (i) static data and (ii) dynamic data, and a data layer configured to store and retrieve the one or more classes of data.

20 Claims, 4 Drawing Sheets

MACHINE INTELLIGENCE PLATFORM

CROSS-REFERENCE TO RELATED APPLICATIONS

The present application is a nonprovisional patent application, which claims the priority benefit of U.S. application Ser. No. 63/122,170, filed Dec. 7, 2020, the text and drawings of which are hereby incorporated in its entirety.

TECHNICAL FIELD

This disclosure relates generally to the field of electronic commerce technology. In particular, it relates to a system and method for managing supplier and vendor information and inquiries.

BACKGROUND

The process of choosing the right supply chain vendors to work with can be challenging for users and administrators associated with entities, such as business owners and managers. Aside from performing search to identify vendors with the capacity to provide supply as needed, and at a competitive price point, the user must also frequently perform complex due-diligence and time-consuming processes to identify those suppliers An intelligent platform is required to reduce risk exposure from fraudulent vendors, suppliers that are insolvent, unable to keep up with demand or who do not comply with safety standards or other regulatory requirements based on a verified supplier directory. A business may have a great idea for a novel product and organize an efficient team to manufacture the product, market it to consumers, fulfill orders, and provide exemplary customer service. However, the requirement of maintaining reliable vendor relationships is essential to facilitate the creation of that product in the first place. Prior approaches do not provide an easy, user-friendly way to perform such due diligence searches or to access a community of reliable suppliers. The presently disclosed embodiments offer improvements to these prior approaches.

BRIEF SUMMARY OF THE INVENTION

The present disclosure relates to a system and method for a machine intelligence platform vendor and supplier information to manage vendor and supplier information. In at least one embodiment, the machine intelligence platform provides an enterprise-scale artificial intelligence (AI) platform to offer a differentiated experience for small and medium businesses (SMBs).

According to some embodiments, a machine intelligence platform system for managing a network of suppliers can include a server, coupled to a processor, and configured to execute instructions that: receive an input from a user; translate the input to a perceived intent; apply one or more algorithms to the perceived intent; and output a response to the user. The server can include a user interface (UI) layer configured to receive the input from a user and to transmit an output to the user, an intent layer configured to translate input received from the UI layer into a perceived intent, an intelligence layer configured to apply one or more algorithms to the perceived intent based on one or more classes of data, the classes of data selected from: (i) static data and (ii) dynamic data; and a data layer configured to store and retrieve the one or more classes of data.

The intent layer includes one or more natural language comprehension models configured to translate the input to a machine-readable intent. The intelligence layer includes one or more engines selected from: a recommendation engine, a question/answer (QA) engine; and a classification engine. The server can be further configured to execute instructions that: determines one or more suppliers of interest to the user; and outputs a response based on the one or more suppliers of interest to the user.

The server can be further configured to determine a response to the user input by performing analysis utilizing a deep neural network. The server can be further configured to execute instructions to train the deep neural network to improve a response accuracy. The server can be further configured to execute instructions to train the deep neural network based on diverse types of data utilizing a gradient descent model, a Newton model, a conjugate model, quasi-Newton model, and a Levenberg-Marquardt model.

BRIEF DESCRIPTION OF THE DRAWINGS/FIGURES

DETAILED DESCRIPTION OF THE INVENTION

Embodiments may be implemented in hardware, firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices, and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
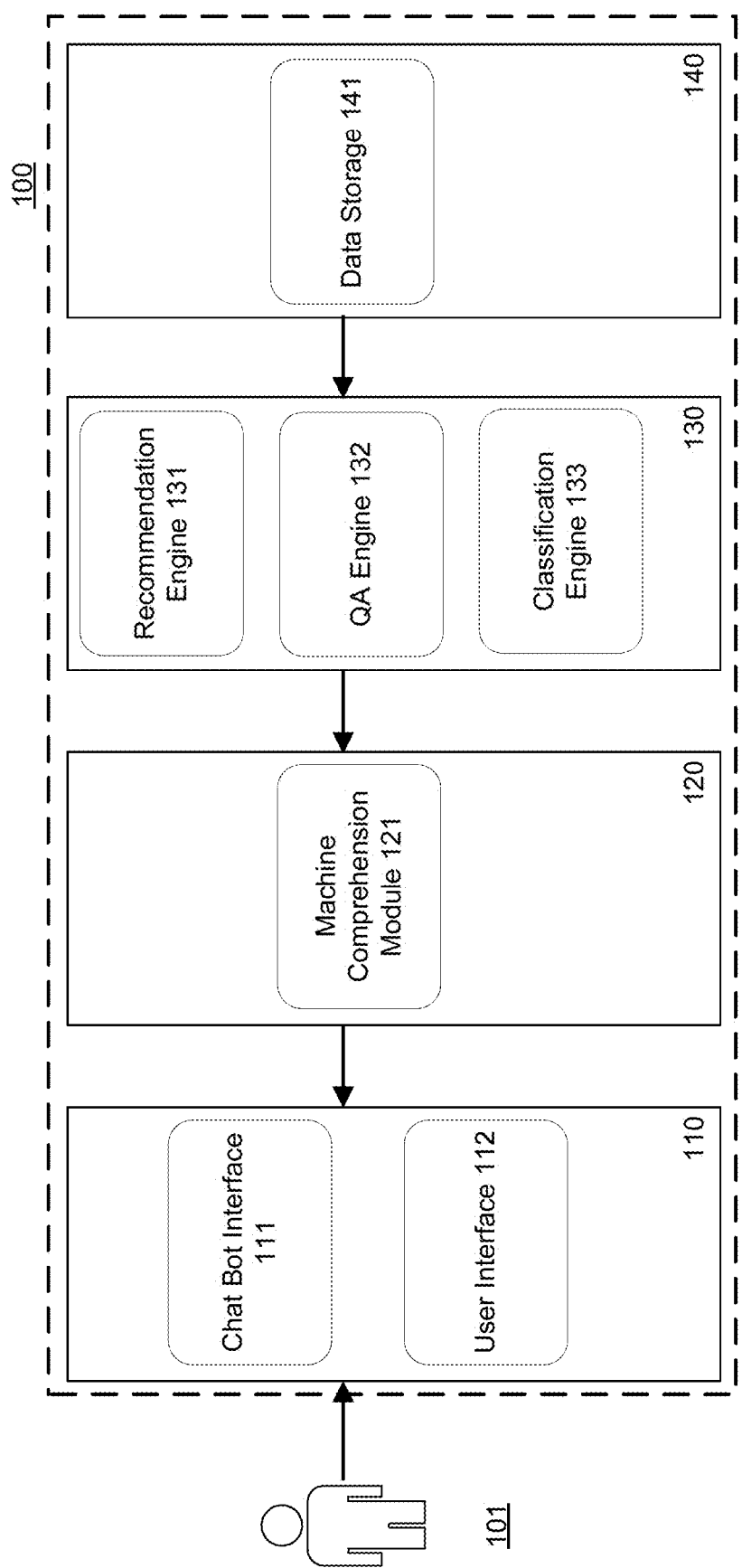
FIG. 1 is an illustration of a system for a machine intelligence platform, according to some embodiments.

FIG. 1 illustrates a machine intelligence platform device 100 (also referred to as the MARLA platform). According to some embodiments, machine intelligence platform device 100 is configured to interact with user 101 and to manage and monitor directory information. In some embodiments, machine intelligence platform device 100 can include one or more recommendation engine(s), machine comprehension engine(s), chat assistant(s), classification engine(s), directory monitor(s), and search assistant(s).

Machine intelligence platform device 100 can be configured to process network and supply chain interactions between user 101 and one or more entities. In some embodiments, user 101 can represent entities such as small or medium sized businesses (SMBs), internal users, other subscribers, and the like. For example, machine intelligence platform device 100 can be configured to learn from the business directory data and provide customer segmentation details and propensity profile of SMBs to drive business operating models.

Machine intelligence platform device 100 can be configured as an intelligent machine trained on diverse types of data, including external third-party data and internal data generated via user interactions on the platform. Machine intelligence platform device 100 can access one or more artificial neural networks (ANNs), for example, a collection of deep neural networks (DNNs) and statistical models to create an unfragmented experience for end users (i.e., user 101).

These models/algorithms are invoked through SMB-initiated actions (clicks and selections) or through a set of internal autonomous processes. Machine intelligence platform device 100 embodies each such model acting in resonance to a secure and scalable cloud infrastructure. Each of these models can be configured to autonomously re-train on new data (in all formats as needed). In this manner, machine intelligence platform device 100 continually develops its proprietary intelligence over a period of time.

From the end user viewpoint, machine intelligence platform device 100 can operate as a networking and supplier platform enabling user 101 to manage, track and monitor supplier and partner related engagements.

As shown in FIG. 1, machine intelligence platform device 100 can include user interface (UI) layer 110, intent layer 120, intelligence layer 130, and data layer 140.

User interface (UI) layer 110 can be configured as an input/output (10) layer that receives an input from a user, such as user 101, and outputs information to user 101 the based on the input (e.g., from another layer of machine intelligence platform device 100, such as intent layer 120.) UI layer 110 can be configured to capture input from user 101 either explicitly, e.g., via chatbot interface 111 or user interface 112, or implicitly through user 101's behavior (clicks, selections, and other long-term interactions, including queries historically requested, searches performed, etc.). UI layer outputs information based on a request pulled from user 101 and/or a push from machine intelligence platform device 100. For example, UI layer 110 can output (based on a pull) information based on a request received directly from the user (e.g., user 101 asks a question and UI layer 110 presents an output as a response). Additionally, or alternatively, UI layer 110 can present information pushed by machine intelligence platform device 100 itself, i.e., from one or more layers thereof. For example, machine intelligence platform device 100 can push, via UI layer 110, changes to reflect recommendations from intelligence layer 120 based on user 101's long-term behavior captured by the system (e.g., UI layer 110 can be configured to push different supplier recommendations to two users respectively, without either user "actively" asking for a recommendation). As described below, this push recommendation can be based on algorithms performed in intelligence layer 120 based on historic data, for example.

Intent layer 120 can include machine comprehension engine 121. Machine comprehension engine 121 can include one or more natural language processing modules configured to translate input received from UI layer 110 into a perceived intent. The intent may be expressed explicitly such as a query to a chatbot, or implicitly such as user's interactions input via UI layer 110. In one example, intent layer 120 can be configured utilizing machine comprehension models which use a natural language understanding (NLU) neural network to capture the user's intent.

Intelligence layer 130 can include machine learning algorithms that include both statistical machine learning models and deep neural networks configured to process data through a set of application programming interfaces (APIs). These models invoke one or more algorithm(s) to drive both internal and external facing business use cases.

In an exemplary embodiment, intelligence layer 130 can include recommendation engine 131, question/answer (QA) engine 132, and classification engine 133. Each of recommendation engine 131, QA engine 132, and classification engine 133 can each include an algorithm to process data and perform training models. According to some embodiments, intelligence layer 130 can include one or more of an artificial neural network, deep neural network, or the like.

In some embodiments, recommendation engine 131, can perform one or more queries based on an input from user 101. Recommendation engine 131 can be configured to generate a query based on user data, user preferences, supplier data, and supplier cohort data. For example, recommendation engine can be configured to perform a query such as "recommend suppliers in a [given zip code]" and implement known suppliers located within the given zip code as well as supplier cohort data relative to the known suppliers. Recommendation engine 131 can utilize one or more recommendation models and/or cohort models to select new objects from a group based on characteristics of known objects depending on the use case.

QA engine 132 can be configured to retrieve data based on one or more question answering models. For example, QA engine 132 can generate a "Frequently Asked Question (FAQ)" response based on a list of FAQs. In some embodiments, QA engine is configured to utilize natural learning processes to match users' queries with known questions encompassed by the FAQ list. QA engine 132 can implement a question answering model based on a neural network-based approach to extract relevant information from a knowledge base of documents to answer users' questions.

Classification engine 133 can be configured to retrieve data based on classification and/or segmentation models. Data retrieved based on classification and segmentation models can be utilized, for example, for supplier scoring, predictions about customer propensity to purchase, etc.

Machine intelligence platform device 100 can include data layer 140. Data layer 140 can include a layer configured to process SQL, data lakes and blob storage. Data layer 140 can include data storage device 141. Further, data layer 140 is configured to perform data processes based on two different classes of data: (i) static data, i.e., non-transactional information, and (ii) dynamic data, i.e., transactional data generated from users' behavior. Static data can include, for example, organization data, users' demographic data, etc. Dynamic data can include, for example, interactions with the various features and components of interface layer 110, past searches, etc.

Figure 2:
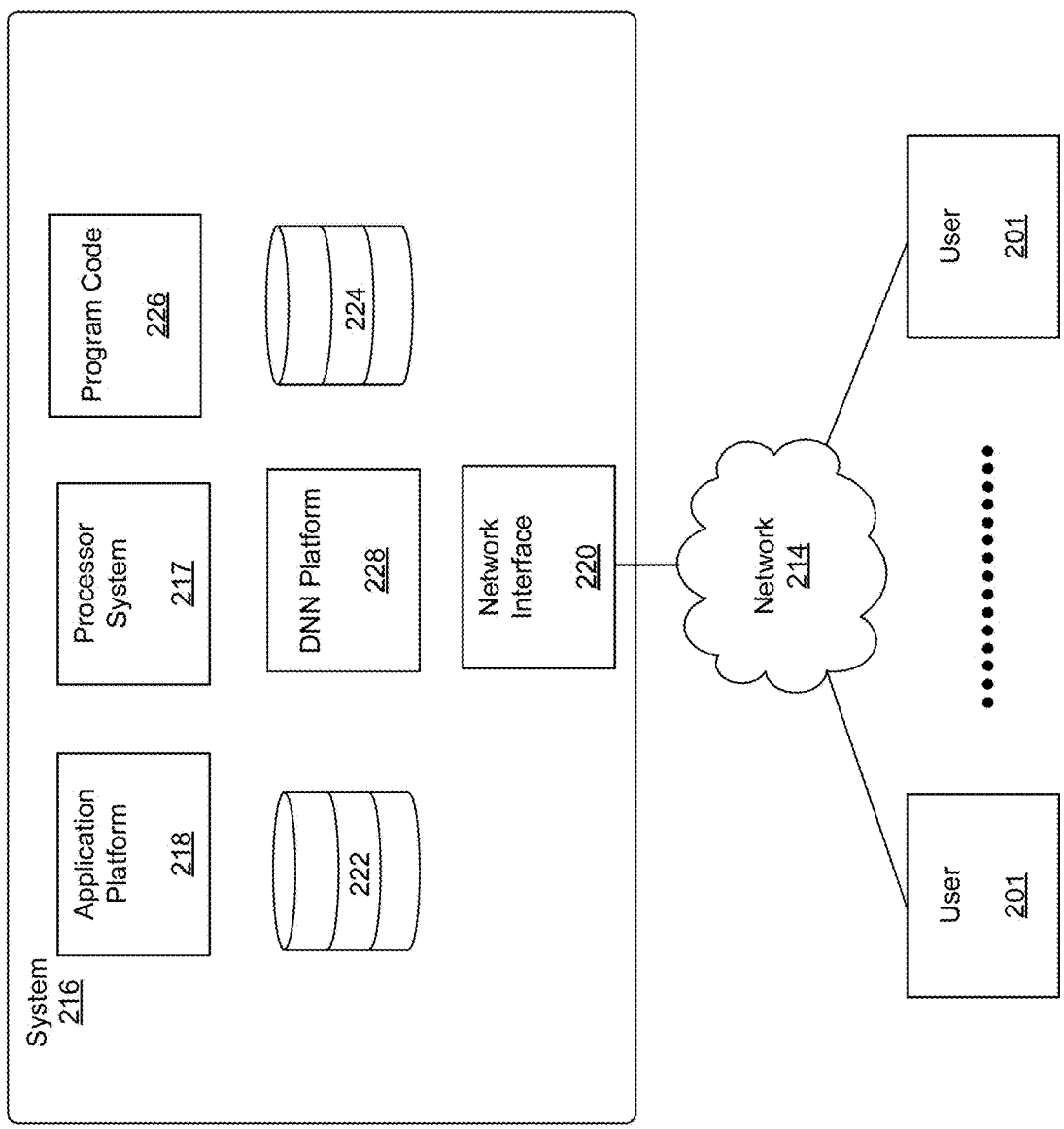
FIG. 2 is an example operating environment of a machine intelligence platform, according to some embodiments.

FIG. 2 illustrates a block diagram of an environment 200 wherein a machine intelligence platform might be used. The environment 200 may include user systems 201, network 214, and machine intelligence platform device 216 (e.g., a computing device, server, or other device). machine intelligence platform device 216 can include a processor system 217, an application platform 218, a network interface 220, static data storage 222, dynamic data storage 224, program code 226, and a DNN platform 228. In other embodiments, the environment 200 may not have all of the components listed and/or may have other elements instead of, or in addition to, those listed above. In this disclosure, a consumer may be synonymously referred to as a customer or patron.

The environment 200 is an environment in which a machine intelligence platform service exists. User system 201 may be any machine or system that is used by customers and/or suppliers to interact with one another. For example, any of the user systems 201 may be a handheld computing device, a mobile phone, a laptop computer, a work station, and/or a network of computing devices. As illustrated in FIG. 2 (and in more detail in FIG. 3) the user systems 201 might interact via the network 214 with a machine intelligence service, which is the system 216.

A machine intelligence platform service, such as the system 216, is a database system that is made available to suppliers and end users that do not need to necessarily be concerned with building and/or maintaining the database system, but instead may be available for their use when they need the database system (e.g., for identifying and interacting with suppliers, vendors, and the like). For example, some on-demand database services may store information from one or more suppliers. A database image may include one or more database objects. A relational database management system (RDMS) or the equivalent may execute storage and retrieval of information against the database object(s). The application platform 218 may be a framework that allows the applications of the system 216 to run, such as the hardware and/or software, e.g., the operating system. In an embodiment, the machine intelligence platform system 216 may include the application platform 218 which enables creation, managing and executing one or more applications developed by the provider of the on-demand database service, interaction between users and a supplier network via user systems 201, or third-party application developers accessing the on-demand database service via the user systems 201.

System 216 can function as an intelligent machine trained on diverse types of data including third-party data and internal data generated via user interactions. System 216 can process network and supply chain interactions between the end-user and one or more entities utilizing deep neural networks and statistical models. For example, system 216 can identify supplier recommendations based on at least one of: first information comprising historical consumption and/or search data of suppliers of interest by the user 201, second information comprising a prediction of one or more suppliers of interest for users 201 based on supplier cohort information, and third information comprising segmentation and/or demographic information.

The network 214 is any network or combination of networks of devices that communicate with one another. For example, the network 214 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The customer systems 101 might communicate with the system 216 using TCP/IP and, at a higher network level, use other common Internet protocols to communicate, such as HTTP, FTP, AFS, WAP, etc. In an example where HTTP is used, the user systems 201 might include an HTTP client commonly referred to as a "browser" for sending and receiving HTTP messages to and from an HTTP server at the system 216. Such an HTTP server might be implemented as the sole network interface between the system 216 and the network 214, but other techniques might be used as well or instead. In some implementations, the interface between the system 216 and the network 214 includes load sharing functionality, such as round-robin HTTP request distributors to balance loads and distribute incoming HTTP requests evenly over a plurality of servers.

In one embodiment, the system 216, shown in FIG. 2, implements a machine intelligence platform system. For example, in one embodiment, the system 216 includes application servers configured to implement and execute machine intelligence platform software applications as well as provide related data, code, forms, webpages and other information to and from the user systems 201 and to store to, and retrieve from, a database system related data, objects, and supplier content. With a machine intelligence platform system, data for multiple users may be stored in the same physical database object, to facilitate analytics processes as an intelligent machine trained on diverse types of data including third-party data and internal data generated via user interactions, to process network and supply chain interactions between the end-user and one or more entities utilizing deep neural networks and statistical models to create an un-fragmented experience for end users 201. For example, the system 216 may provide access to multiple hosted (standard and custom) applications, including a machine intelligence platform service application.

Several elements in the system shown in FIG. 2 include conventional, well-known elements that are explained only briefly here. For example, each of the user systems 201 could include a desktop personal computer, workstation, laptop, PDA, cell phone, or any wireless access protocol (WAP) enabled device or any other computing device capable of interfacing directly or indirectly to the Internet or other network connection. Each of the user systems 201 typically runs an HTTP client, e.g., a browsing program, such as Microsoft's Edge browser, Google's Chrome browser, Opera's browser, or a WAP-enabled browser in the case of a cell phone, PDA or other wireless device, or the like, allowing a customer of the user systems 201 to access, process and view information, pages and applications available to it from the system 216 over the network 214. Each of the user systems 201 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 216 or other systems or servers. For example, the user interface device may be used to access data and applications hosted by the system 216, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 201 and all of its components are operator configurable using applications, such as a browser, including computer code run using a central processing unit such as an INTEL XEON or PENTIUM processor, AMD EPYC or RYZIEN processor, or the like. Similarly, the system 216 and all of their components might be operator configurable using application(s) including computer code to run using a central processing unit such as the processor system 217, which may include an INTEL XEON or PENTIUM processor, AMD EPYC or RYZIEN processor, or the like, and/or multiple processor units. A computer program product embodiment includes a machine-readable storage medium (media) having instructions stored thereon/in which may be used to program a computer to perform any of the processes of the embodiments described herein. Computer code for operating and configuring the system 216 to intercommunicate and to process webpages, applications and other data and media content as described herein are, for example, downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), micro-drive, and magneto-optical disks, and magnetic or optical cards, Nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 3:
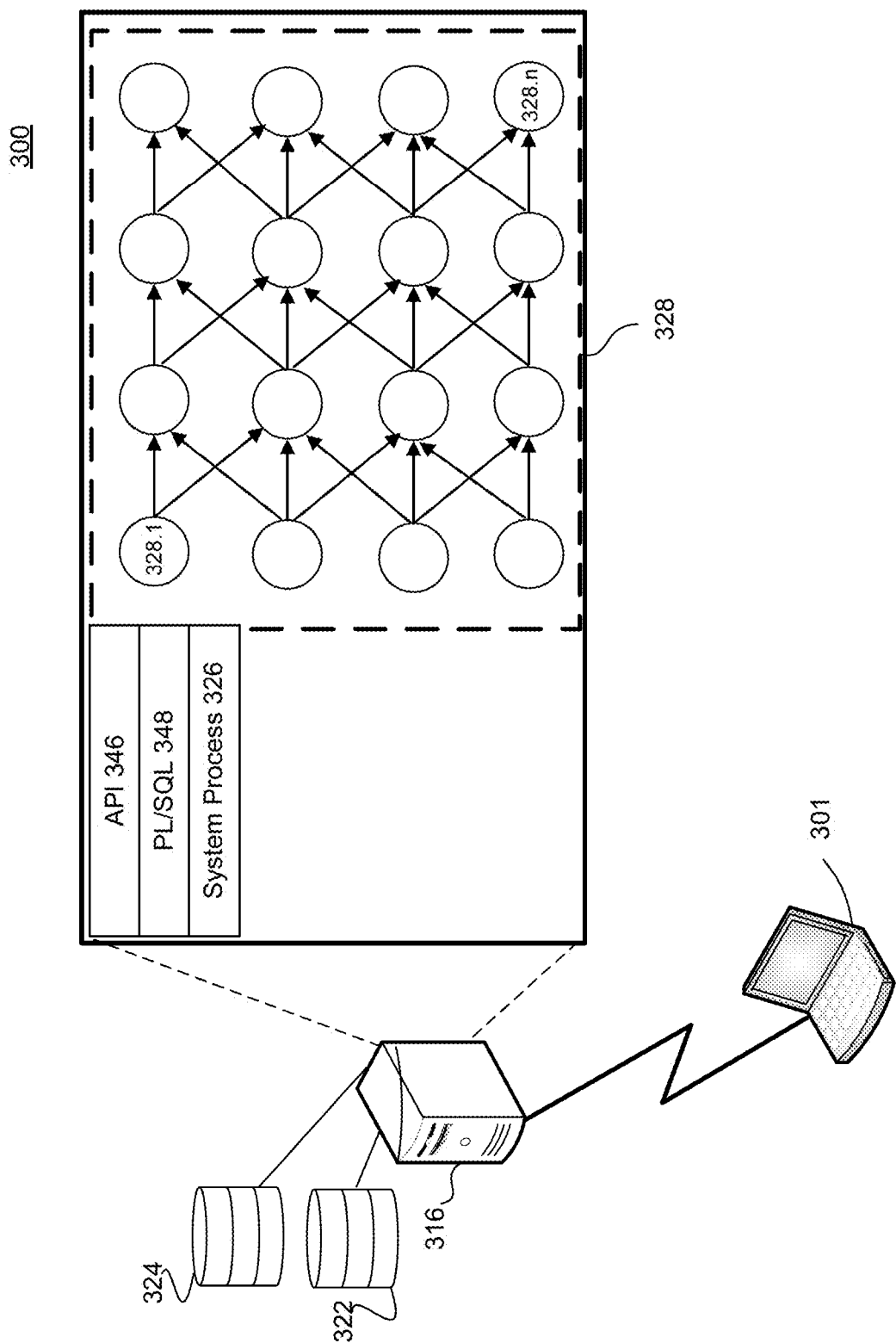
FIG. 3 is an example operating environment of a machine intelligence platform, according to some embodiments.

One arrangement for elements of the system 216 is shown in FIG. 3, including the network interface 220, the application platform 218, the static data storage 222, the dynamic data storage 224, the program code 226 for implementing various functions of the system 216, and the DNN platform 228 for determining associations and importance of input to generate an output as part of a machine intelligence platform service and the like. As generally described above, in some embodiments, platform space 228 can access and train on diverse types of data, including external third-party data and internal data generated via user interactions on the platform. DNN platform 228 can utilize a collection of deep neural networks and statistical models to create an unfragmented experience for end users. Some of the information that DNN platform 228 can access and train on can include first information comprising historical consumption data of suppliers of interest by the user 201, second information comprising a prediction of one or more suppliers of interest for users 201 based on supplier cohort information, and third information comprising segmentation and/or demographic information. Additional processes that may execute on the system 216 include database indexing processes.

FIG. 3 also illustrates the environment 200. In FIG. 3, elements of the system 301 and various interconnections in an embodiment are further illustrated. FIG. 3 shows the user device 301, network 314 and the system 316. FIG. 3 also shows that the system 316 may include static data storage 222, dynamic data storage 224, an Application Program Interface (API) 346, a PL/SOQL 348, system process space 326, and deep neural network (DNN) 328. In other embodiments, the environment 300 may not have the same elements as those listed above and/or may have other elements instead of, or in addition to, those listed above.

The user devices 301, network 314, system 316, static data storage 322, and dynamic data storage 324 can be embodiments of user systems 201, network 214, system 216, static data storage 222, and dynamic data storage 224 discussed above in FIG. 2. System 316 may include the network interface 220 (of FIG. 2) implemented as a set of HTTP application servers.

System process space 328, which can be an embodiment of program code 228, can be configured to static data storage 322 and dynamic data storage 324 therein to fulfill recommendations and queries placed from user devices 301. Invocations to such applications may be coded using the PL/SOQL 348 that provides a programming language style interface extension to the API 346.

Each database can generally be viewed as a collection of objects, such as a set of logical tables, containing data fitted into predefined categories. A "table" is one representation of a data object, and a table may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a user database may include a table that describes an end user with fields for basic contact information such as name, address, phone number, fax number, etc. Another table might describe a purchase order, including fields for information such as customer, supplier, product, sale price, date, etc. In some database systems, standard entity tables might be provided for use by all users.

DNN 328 can be represented as a collection of neurons (e.g., nodes 328.1 to 328.$m$). Nodes 328.1 to 328.$n$ can be organized in layers, each node performing a simple computation to collectively implement a complex nonlinear mapping from an input to a subsequent output. This mapping is learned from the data utilizing model training and other processes that may be recognized in the art, such as error backpropagation, a Newton model, a conjugate model, quasi-Newton model, a Levenberg-Marquardt model, supervised learning, unsupervised learning, neuroevolution, etc. As described above, DNN 328 can access and train on diverse types of data, including external third-party data and internal data generated via user interactions on the platform. DNN platform 228 be utilized to create an unfragmented experience for end users based on, for example, first information comprising historical consumption data of suppliers of interest by the user of user device 301, second information comprising a prediction of one or more suppliers of interest for a user of user device 301 based on supplier cohort information, and third information comprising segmentation and/or demographic information.

System 300 may be communicably coupled to database systems, e.g., having access to the static data storage 322 and the dynamic data storage 324, via a different network connection. For example, one application server might be coupled via the network 314 (e.g., the Internet), another application server might be coupled via a direct network link, and another application server might be coupled by yet a different network connection. Transfer Control Protocol and Internet Protocol (TCP/IP) are typical protocols for communicating between application servers 330 and the database system. However, it will be apparent to one skilled in the art that other transport protocols may be used to optimize the system depending on the network interconnect used. Because it is desirable to be able to add and remove application servers from the server pool at any time for any reason, there is no server affinity for a user and/or organization to a specific application server. In one embodiment, therefore, an interface system implementing a load balancing function (e.g., an F5 Big-IP load balancer) is communicably coupled between the application servers and the user systems 301 to distribute requests to the application servers. In one embodiment, the load balancer uses a least connections algorithm to route customer requests to the application servers. Other examples of load balancing algorithms, such as round robin and observed response time, also may be used.

It should be understood that the operations shown in the exemplary methods are not exhaustive and that other operations can be performed as well before, after, or between any of the illustrated operations. In some embodiments of the present disclosure, the operations can be performed in a different order and/or vary.

Figure 4:
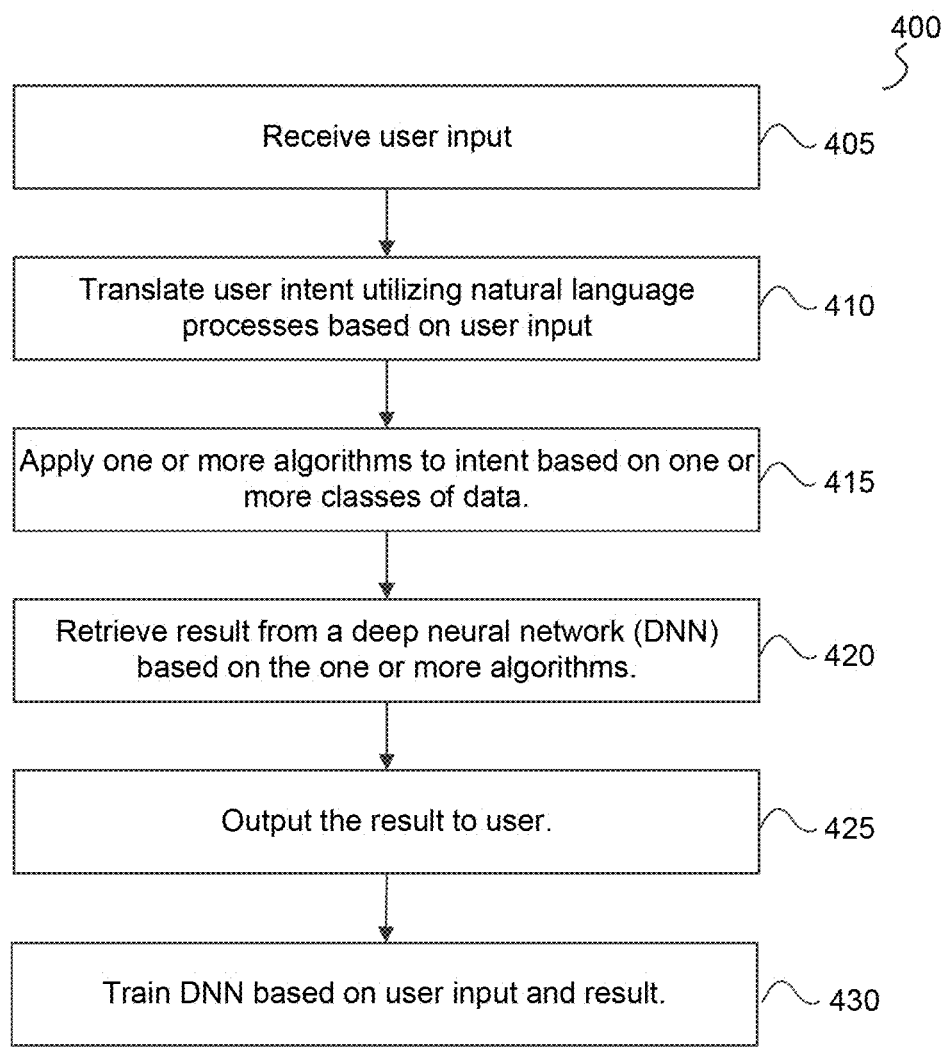
FIG. 4 is a flow diagram of a method for deploying a a machine intelligence platform, according to some embodiments.

FIG. 4 is a flow diagram of a method 400 for performing machine intelligence service operations, according to some embodiments of the present disclosure. In some embodiments, method 400 provides operational steps to learn from business directory data and provide customer segmentation details and propensity profile of SMBs to drive business operating models.

At operation 405, a computing device can capture input from a user, such as 101.

Operation 405 can include collecting input submitted either explicitly, e.g., via chatbot or user interface, or implicitly through current and/or historical user interactions. requested, searches performed, etc.).

At operation 410, the computing device can translate a user intent based on the input utilizing natural language processes based on the user input captured at operation 405. According to some embodiments, operation 405 can translate the user intent based on natural language learning processes. Such processes can include semantic search, machine learning, natural language programming, sentiment analysis, affective computing, the modular fulfillment center is configured to support order fulfillment to the consumers, speech recognition, optical character recognition, etc. For example, the computing device at 410 can initiate a process of determining type of inquiry a user is attempting to perform via the machine intelligence platform. The computing device can utilize a natural language process to translate the input into a query to be executed by the computing device.

At operation 415, the computing device can apply one or more algorithms to intent based on one or more classes of data. In some embodiments, operation 415 can include a recommendation engine performing one or more queries based on an input from user 101. For example, a recommendation engine can be configured to generate a query based on user data, user preferences, supplier data, and supplier cohort data. A recommendation engine can utilize one or more recommendation models and/or cohort models to select new objects from a group based on characteristics of known objects depending on the use case. According to some embodiments, operation 415 can include a QA engine 132 retrieving data based on one or more question answering models. For example, a QA engine can generate a "Frequently Asked Question (FAQ)" response based on a list of FAQs and can utilize natural learning processes to match users' queries with known questions encompassed by the FAQ list. According to some embodiments, operation 415 can include a classification engine retrieving data based on classification and/or segmentation models, such as for supplier scoring, predictions about customer propensity to purchase, etc. Operation 415 can be implemented utilizing a neural network-based approach to extract relevant information relevant to the query.

At operation 420, the computing device can retrieve a result from a deep neural network (DNN) based on the one or more algorithms. Deep learning algorithms can include convolutional Neural Networks (CNNs), Generative Adversarial Networks (GANs), Restricted Boltzmann Machines (RBMs), Self Organizing Maps (SOMs), Deep Belief Networks (DBNs), Long Short Term Memory Networks (LSTMs), Recurrent Neural Networks (RNNs), and the like.

At operation 425, the computing device can output information to a user, such as user 101. For example, operation 425 can include a UI layer outputting information based on a request pulled from the user and/or a push from machine intelligence platform service 100. For example, operation 425 can include an output (based on a pull) as a response to a user inquiry. Additionally, or alternatively, operation 425 can include presenting information pushed by machine intelligence platform service via a user interface to reflect recommendations from an intelligence layer based on the user long-term behavior captured by the system.

At operation 430, the computing device can perform a training function to improve a response of one or more neural networks, such as DNN 328, based on diverse types of data. According to some embodiments operation 430 can include utilizing external third-party data and internal data generated via user interactions on the platform to train one or more neural networks. According to some embodiments, operation 430 can include training a neural network based on a gradient descent model, a Newton model, a conjugate model, quasi-Newton model, a Levenberg-Marquardt model, or the like.

These models can be trained based SMB-initiated actions (clicks and selections) or through a set of internal autonomous processes such that the one or more neural networks continually develops its proprietary intelligence over a period of time.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A machine intelligence platform system for managing a network of suppliers, comprising:
    a server, coupled to a processor, and configured to execute instructions that:
        perform, at an intent layer, context awareness wherein the intent layer performs the context awareness using natural language processing to:
            (i) receive user input comprising (a) one or more user queries and (b) one or more navigation patterns and/or selection behaviors,
            (2) translate the input into a machine-readable format, and
            (3) derive the user's intent from explicit signals based on the user queries and implicit signals based on the navigation patterns;
        apply, at an intelligence layer, one or more algorithms to the perceived intent based on one or more classes of data, the classes of data selected from: (i) static data and (ii) dynamic data, wherein the one or more algorithms comprise generating queries based on user data and supplier data, responding to user queries using a neural network-based model for natural language processing, and performing data segmentation and supplier scoring, the algorithms utilizing application programming interfaces (APIs) for data interchange; and
        store and retrieve, at a data layer, the one or more classes of data, wherein the static data comprises organization and demographic information and wherein the dynamic data comprises information about user interactions, with enhanced security and traceability mechanisms suitable for handling large volumes of data efficiently.

2. The system of claim 1, wherein the intent layer comprises one or more natural language comprehension models that translate the input to a machine-readable intent.

3. The system of claim 1, wherein the intelligence layer comprises one or more engines selected from: a recommendation engine, a question/answer (QA) engine; and a classification engine.

4. The system of claim 1, wherein the server is further configured to execute instructions that:
    determines one or more suppliers of interest to the user; and
    outputs a response based on the one or more suppliers of interest to the user.

5. The system of claim 1, wherein the server is further configured to determine a response to the user input by performing analysis utilizing a deep neural network.

6. The system of claim 5, wherein the server is further configured to execute instructions to train the deep neural network to improve a response accuracy.

7. The system of claim 6, wherein the server is further configured to execute instructions to train the deep neural network based on diverse types of data utilizing a gradient descent model, a Newton model, a conjugate model, quasi-Newton model, and a Levenberg-Marquardt model.

8. A method for managing a network of suppliers, comprising:
    receiving, at a user interface (UI) layer of a computing device, an input from a user;
    translating, at an intent layer of the computing device, the input to a perceived intent, wherein the translating comprises:
        perform context awareness using natural language processing to:
            (i) receive user input comprising (a) one or more user queries and (b) one or more navigation patterns and/or selection behaviors,
            (2) translate the input into a machine-readable format, and
            (3) derive the user's intent from explicit signals based on the user queries and implicit signals based on the navigation patterns;
    applying, at an intelligence layer of the device, one or more algorithms to the perceived intent, wherein the one or more algorithms comprise generating queries based on user data and supplier data, responding to user queries using a neural network-based model for natural language processing, and performing data segmentation and supplier scoring, the algorithms utilizing application programming interfaces (APIs) for data interchange; and
    outputting, at the UI layer of the device, a response to the user.

9. The method of claim 8, wherein the intent layer comprises one or more natural language comprehension models that translate the input to a machine-readable intent.

10. The method of claim 8, wherein the intelligence layer comprises one or more engines selected from: a recommendation engine, a question/answer (QA) engine; and a classification engine.

11. The method of claim 8, further comprising:
    determining one or more suppliers of interest to the user; and
    outputting a response based on the one or more suppliers of interest to the user.

12. The method of claim 8, further comprising determining a response to the user input by performing analysis utilizing a deep neural network.

13. The method of claim 12, further comprising training the deep neural network to improve a response accuracy.

14. The method of claim 13, wherein the training comprises training the deep neural network based on diverse types of data utilizing a gradient descent model, a Newton model, a conjugate model, quasi-Newton model, and a Levenberg-Marquardt model.

15. A non-transitory tangible computer-readable device having instructions stored thereon that, when executed by a computing device, cause the computing device to perform operations comprising:
    receiving, at a user interface (UI) layer of the computing device, an input from a user;
    translating, at an intent layer of the computing device, the input to a perceived intent, wherein the intent layer comprises:
        a machine comprehension engine to enable context awareness using one or more natural language processing to:
            (i) receive user input comprising (a) one or more user queries and (b) one or more navigation patterns and/or selection behaviors, (2) translate the input into a machine-readable format, and (3) derive the user's intent from explicit signals based on the user queries and implicit signals based on the navigation patterns;

applying, at an intelligence layer of the device, one or more algorithms to the perceived intent, wherein the one or more algorithms generating queries based on user data and supplier data, responding to user queries using a neural network-based model for natural language processing, and performing data segmentation and supplier scoring, the algorithms utilizing application programming interfaces (APIs) for data interchanges; and outputting, at the UI layer of the device, a response to the user.

16. The computer-readable device of claim 15, wherein the intelligence layer comprises one or more engines selected from: a recommendation engine, a question/answer (QA) engine; and a classification engine.

17. The computer-readable device of claim 15, further comprising:

determining one or more suppliers of interest to the user; and outputting a response based on the one or more suppliers of interest to the user.

18. The computer-readable device of claim 15, further comprising determining a response to the user input by performing analysis utilizing a deep neural network.

19. The computer-readable device of claim 18, further comprising training the deep neural network to improve a response accuracy.

20. The computer-readable device of claim 19, wherein the training comprises training the deep neural network based on diverse types of data utilizing a gradient descent model, a Newton model, a conjugate model, quasi-Newton model, and a Levenberg-Marquardt model.

* * * * *